United States Patent [19]

Wachi

[11] Patent Number: 5,148,424
[45] Date of Patent: Sep. 15, 1992

[54] DETRACK DETECTING SYSTEM IN AN OPTICAL RECORDING/REPRODUCING APPARATUS

[75] Inventor: Shigeaki Wachi, Tokyo, Japan

[73] Assignee: Sony Corporation, Tokyo, Japan

[21] Appl. No.: 499,641

[22] Filed: Mar. 27, 1990

[30] Foreign Application Priority Data

Apr. 14, 1989 [JP] Japan .................................. 1-93028

[51] Int. Cl.$^5$ .......................... G11B 7/08; G11B 7/125
[52] U.S. Cl. ............................. 369/44.37; 369/44.41; 369/44.28
[58] Field of Search ............... 369/44.37, 44.38, 44.41, 369/44.42, 44.28; 250/201.5; 360/78.01

[56] References Cited

U.S. PATENT DOCUMENTS

| 4,598,393 | 7/1986 | Pierce et al. | 369/44.38 |
| 4,660,191 | 4/1987 | Maeda et al. | 369/44.41 |
| 4,669,072 | 5/1987 | Miura et al. | 369/44 |
| 4,750,162 | 6/1988 | Tajima | 369/44.41 |
| 4,817,073 | 3/1989 | Suzuki | 36/44.28 |

FOREIGN PATENT DOCUMENTS 0095766 12/1983 European Pat. Off. .

Primary Examiner—Roy N. Envall, Jr.
Assistant Examiner—Khoi Truong
Attorney, Agent, or Firm—Lewis H. Eslinger; Donald S. Dowden

[57] ABSTRACT

A detrack detecting system for detecting deviation of the beam spot from the track in an optical recording/reproducing apparatus in which recording and reproducing of data are performed by irradiating optical beams onto an optical disc. Three beam spots are irradiated at positions on the optical disc which are away from each other by a predetermined distance. The reflected lights are respectively detected by three photodetectors whose photo sensitive surfaces are divided and tracking error signals are detected by a push-pull system. A tracking error signal obtained from the center beam spot of the three beam spots and tracking error signals obtained from other two beam spots are respectively added to obtain the first and second composite tracking error signals. Detracking state is detected based on the polarities of the first and second composite tracking error signals.

8 Claims, 6 Drawing Sheets

FIG. 4
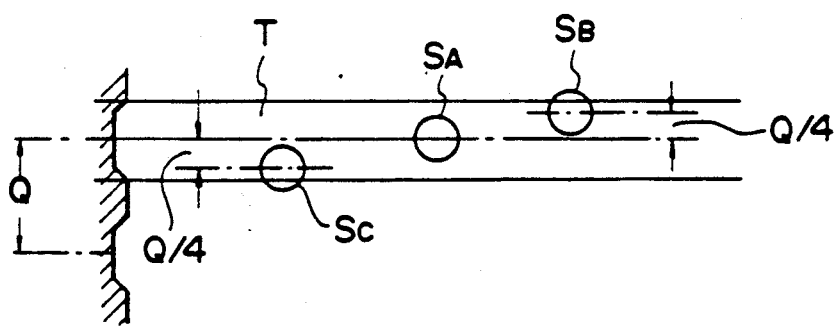
FIG. 5
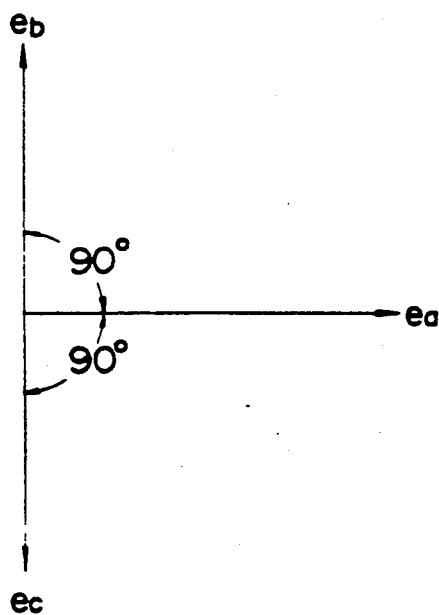
FIG. 6A
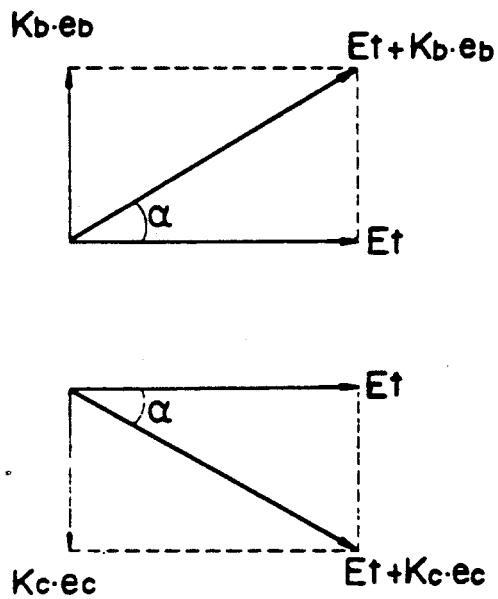
FIG. 6B

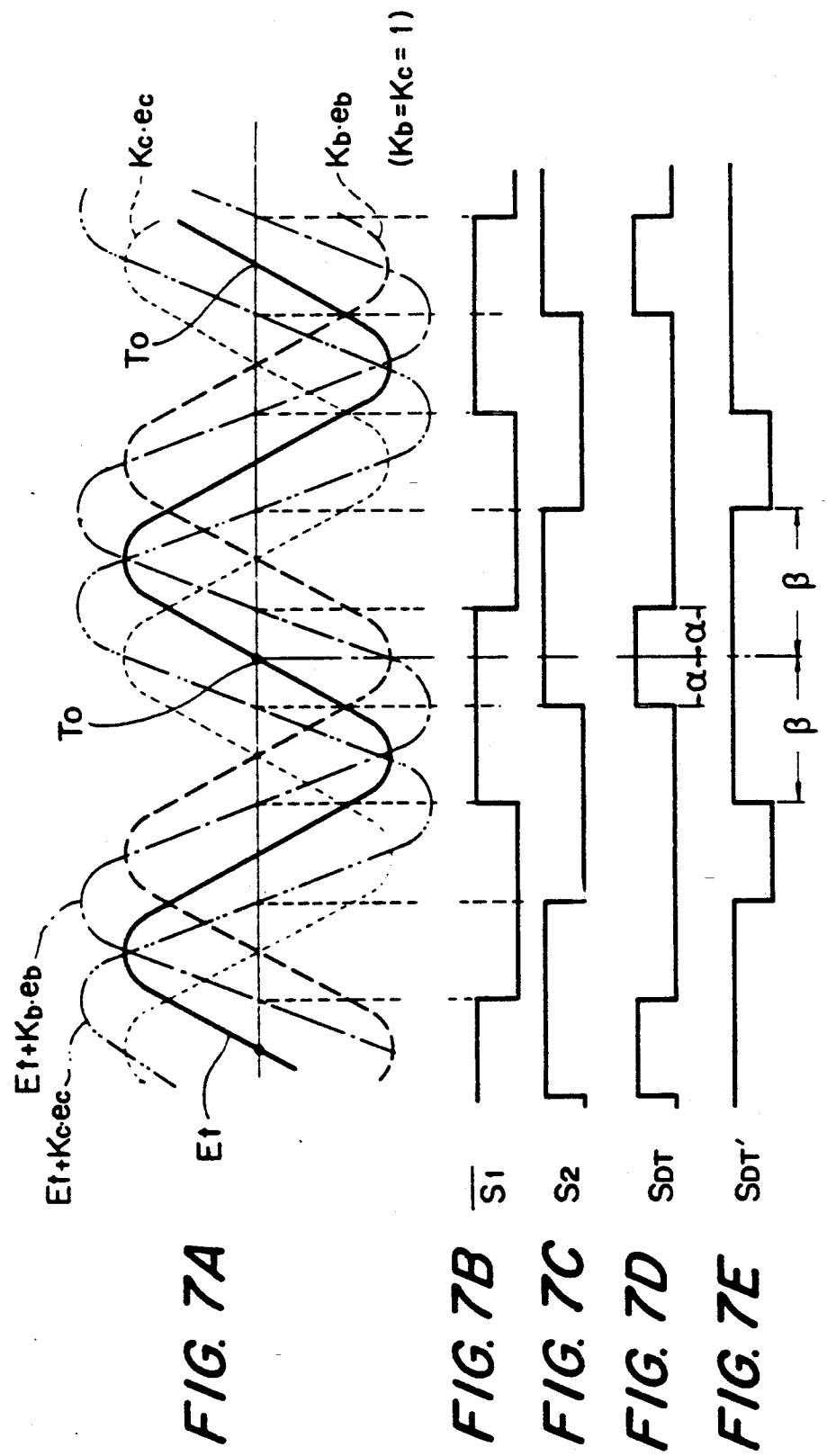

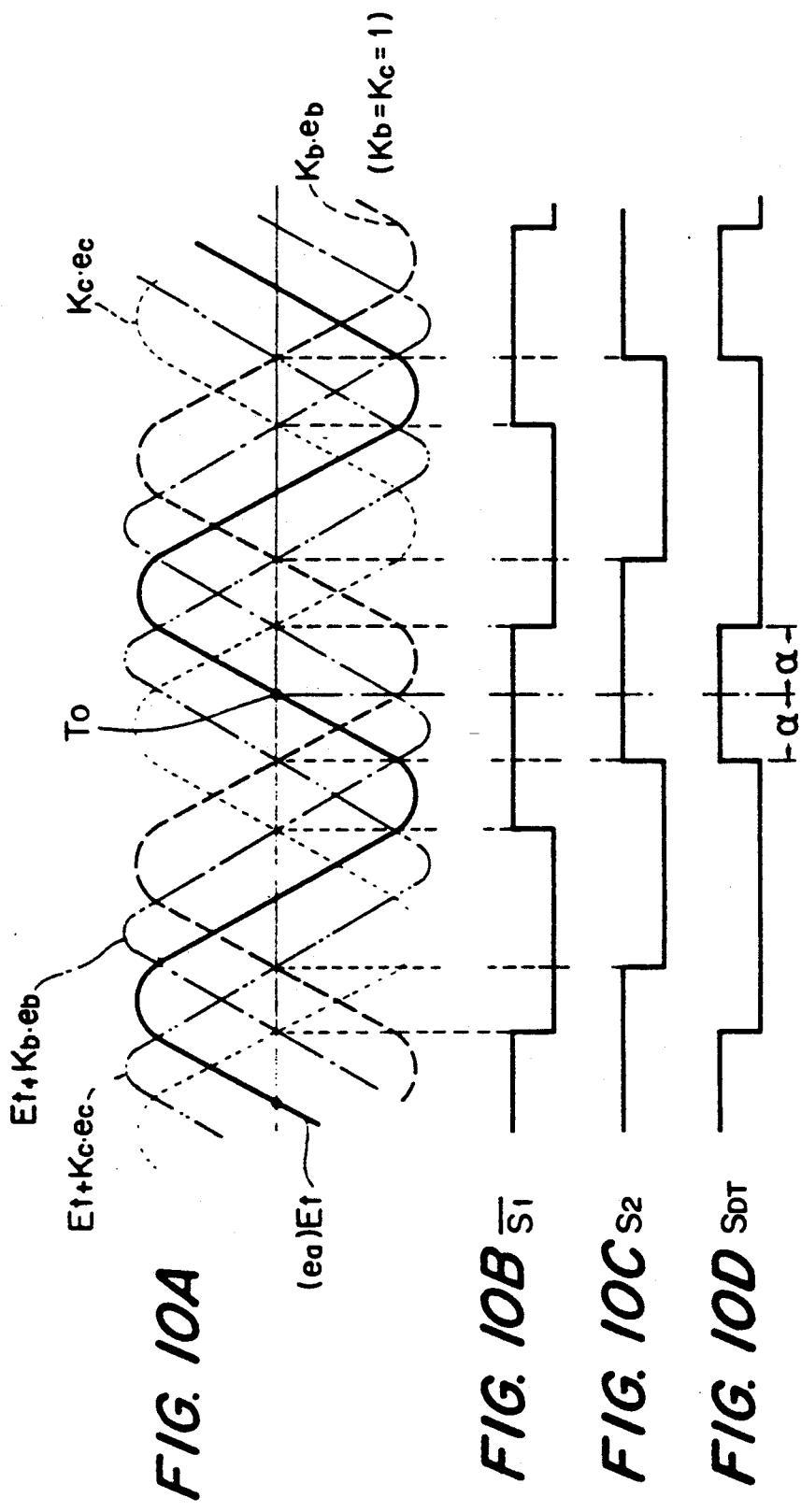

DETRACK DETECTING SYSTEM IN AN OPTICAL RECORDING/REPRODUCING APPARATUS

BACKGROUND OF THE INVENTION

1. Field of the Invention

The present invention relates to a detrack detecting system for detecting deviation o the beam spot from the track in an optical recording/reproducing apparatus in which recording and reproducing of data are performed by irradiating an optical beam onto an optical disc.

2. Description of the Prior Art

There has been put into practical use an optical disc in which a recording medium such that the reflectance changes in response to the light is provided on a recording surface of the optical disc, thereby enabling information to be recorded and reproduced.

In such a writable optical disc, for instance, as shown in FIG. 1, a spiral track is divided into n sectors $S_{c1}$, $S_{c2}$, $S_{c3}$, ..., $S_{c4}$ and address areas $AD_1$, $AD_2$, $AD_3$, ... in which track address data is recorded are formed in the head portions of the sectors. A laser beam which was modulated by recording data is irradiated onto the data recording areas of the sectors $S_{c1}$, $S_{c2}$, $S_{c3}$, ..., so that the temperature of that portion rapidly rises and recording dots ar formed onto the disc surface. By irradiating a laser beam which is weaker than that upon recording, the recorded data can be read out without destroying the recording dots.

The laser beam which is irradiated onto the optical disc as mentioned above is controlled in a manner such that, in the recording and erasing modes, the laser power which is a few times as large as that in the reading mode is supplied. Therefore, when a strong vibration is applied to the optical recording/reproducing apparatus in the recording or erasing mode and the tracking servo is made inoperative, a serious accident happens such that the data which has already been written is destroyed or data is written to a wrong track on the optical disc.

Therefore, as shown in FIG. 2, there is considered a method whereby an amplitude of a tracking error signal which is obtained from the reflected light of the beam spot which was irradiated onto the optical disc is compared with reference levels $Et_1$ and $Et_2$ and when the tracking error signal exceeding the reference levels is output, it is regarded that the optical recording/reproducing apparatus is in the detracking state and when the detracking state is detected in the recording mode, the writing mode is cancelled at this time point and the erroneous recording or erroneous erasure of data is prevented.

However, in the detrack detecting system as mentioned above, since the level of tracking error signal changes according to the kind of optical disc or the reflectance of the optical disc, there is a problem such that even if the tracking error signal level is compared with the reference levels, it is difficult to detect an accurate detrack position.

OBJECTS AND SUMMARY OF THE INVENTION

It is an object of the present invention to provide a detrack detecting system in an optical recording/reproducing apparatus which can accurately detect the detracking state even in the case where the reflectances of the optical discs are different.

According to an aspect of the present invention, there is provided a detrack detecting system in an optical recording/reproducing apparatus in which recording and reproducing of data are performed by irradiating beam spots onto an optical disc, comprising:

means for irradiating the first beam spot which follows the center of a data recording track:

means for irradiating the second and third beam spots positions which are away from the first beam spot by a predetermined distance on the inner circumferential side and the outer circumferential side in the radial direction, respectively; and first, second and third photodetectors for detecting the reflected lights from the first, second and third beam spots, respectively, wherein the first tracking error signal obtained from the first photodetector and the second and third tracking error signals obtained from the second and third photodetectors are respectively added to form the first and second composite tracking error signals, and the detracking state is detected based on the polarities of the first and second composite tracking error signals.

The above, and other, objects, features and advantages of the present invention will become readily apparent from the following detailed description thereof which is to be read in connection with the accompanying drawings.

BRIEF DESCRIPTION OF THE DRAWINGS

FIG. 4 is an explanatory diagram of beam irradiating positions;

FIG. 5 is an explanatory diagram of phase differences among three tracking error signals;

FIG. 6, consisting of FIGS. 6A and 6B, is an explanatory diagram of composite tracking error signals;

FIG. 7, consisting of FIGS. 7A, 7B, 7C, 7D and 7E, is a waveform diagram for explaining detrack signals;

FIG. 10A, 10B, 10C, 10D is an explanatory diagram of composite tracking error signals in another embodiment.

DETAILED DESCRIPTION OF THE PREFERRED EMBODIMENTS

Figure 1:
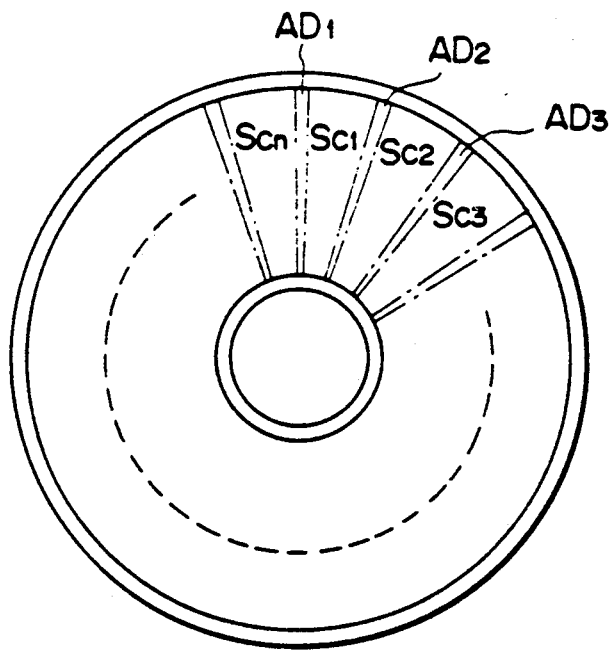
FIG. 1 is an explanatory diagram of a writable optical disc.
Figure 2:
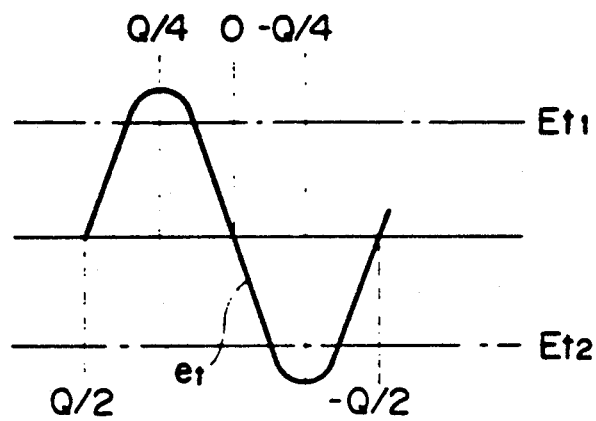
FIG. 2 is an explanatory diagram of tracking error signals.
Figure 3:
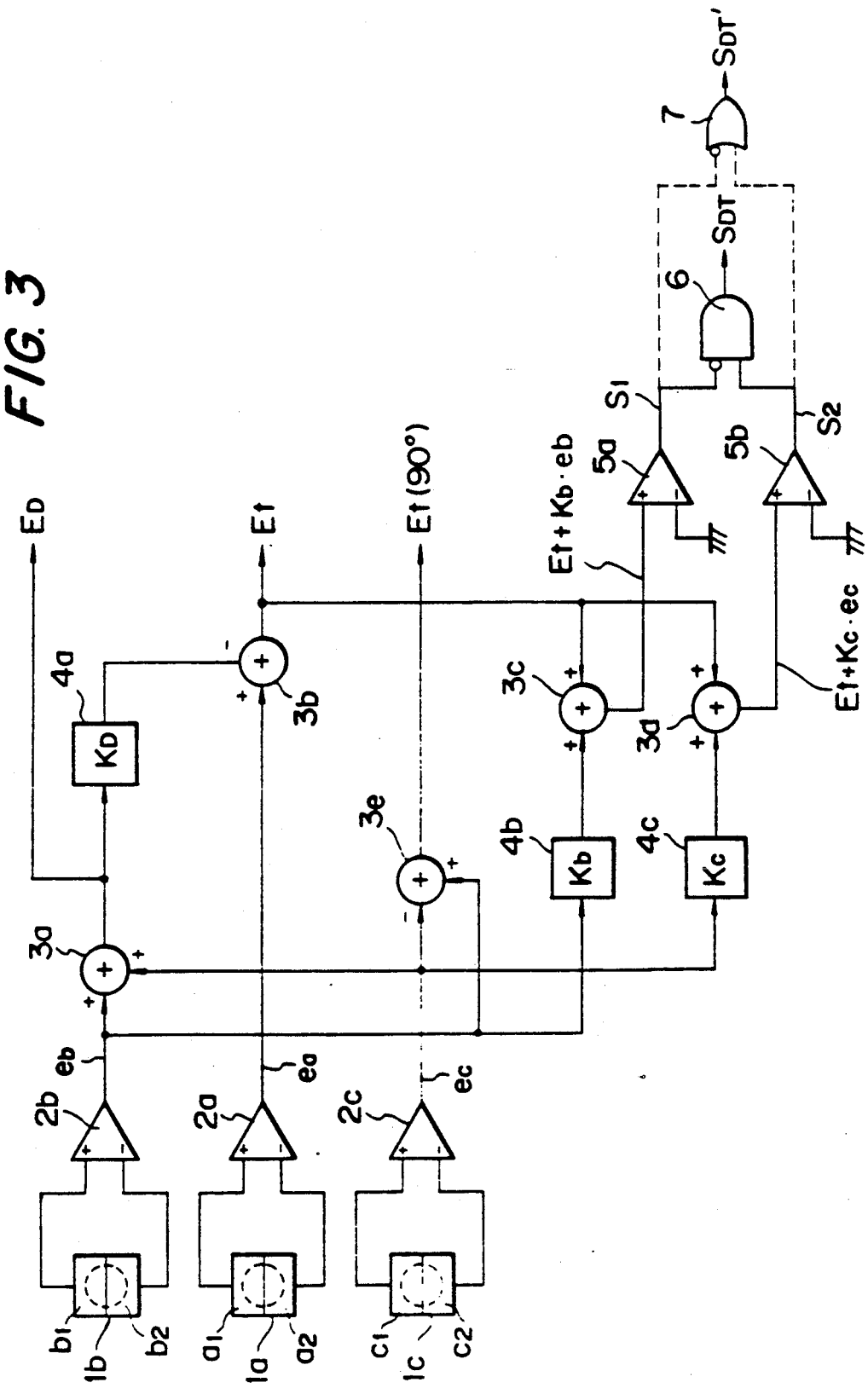
FIG. 3 is a block diagram showing an embodiment of the present invention.

FIG. 3 shows a schematic block diagram of a detrack detecting system of an optical recording/reproducing apparatus of the present invention.

In FIG. 3, reference numerals $1a$, $1b$, and $1c$ respectively denote two-divided detectors to which the reflected lights of the first, second and third beam spots which were irradiated onto an optical disc are input. Reference numerals $2a$, $2b$ and $2c$ indicate comparing circuits for calculating differences among signals which are output from photo sensitive surfaces $a_1-a_2$, $b_1-b_2$, $c_1-c_2$ of the detectors $1a$, $1b$, and $1c$; $3a$, $3b$, $3c$, $3d$, and $3e$ represent adding circuits; and $4a$, $4b$, and $4c$ denote coefficient circuits.

As will be explained hereinlater, reference numerals 5a, 5b, and 6 denote 0-level comparators and a logic circuit for discriminating polarities of composite tracking error signals and detecting the detracking state.

FIG. 4 shows the positions of the beam spots irradiated onto the optical disc. The three beam spots are irradiated in a manner such that the first beam spot $S_A$ is located on a track T of the optical disc and the second and third beam spots $S_B$ and $S_C$ are located so as to be away from the first beam spot $S_A$ by a ¼ track pitch on the inner circumferential side and the outer circumferential side in the radial direction of the optical disc, respectively.

Therefore, for example, when the three beam spots $S_A$, $S_B$ and $S_C$ are traversed in the radial direction of the optical disc, the phases of the tracking error signals which are obtained at this time are set such that tracking error signals $e_b$ and $e_c$ which are obtained from the second and third detectors 1b and 1c have a phase difference of 90° from a tracking error signal $e_a$ which is output from the first detector 1a as shown in FIG. 5, respectively.

Accordingly, when the tracking error signals $e_b$ and $e_c$ which are obtained from the second and the third detectors 1b and 1c are supplied to the adding circuit 3a and are added, the tracking error signal component is set to 0. However, a DC component $E_D$ which is output due to a skew of the optical disc and an optical offset is detected.

The DC component $E_B$ is multiplied with a coefficient $K_D$ by the coefficient circuit 4a and is input to the second adding circuit 3b. In the adding circuit 3b, the DC component included in the tracking error signal $e_a$ obtained from the first detector 1a is cancelled, thereby forming a tracking error signal Et without an offset.

The tracking error signal Et and the signals which are obtained by multiplying coefficients $K_b$ and $K_c$ to the tracking error signals $e_b$ and $e_c$ are respectively added by the adding circuits 3c and 3d. Thus, as shown in a vector diagram of FIG. 6, composite tracking error signals (Et + $e_b \cdot K_b$) and (Et + $e_c \cdot K_c$) are formed. The detracking state can be detected from the composite tracking error signals.

That is, as shown in FIG. 7, the composite tracking error signals (Et + $e_b \cdot K_b$) and (Et + $e_c \cdot K_c$) are respectively input to the comparators 5a and 5b. Waveforms $S_1$ and $S_2$ which are inverted at zero-cross points are generated. When those waveforms are supplied to the AND gate 6 whose one input terminal is used as a negative logic input, an $S_{BT}$ signal is output from the AND gate 6.

Since the output $S_{BT}$ is set to the H level at positions before and after (a range of $\pm \alpha$) an on-track point $T_O$ of the tracking error signal, when the output $S_{BT}$ of the AND gate 6 is set to the L level, such a state can be determined to be the detracking state.

The on-track range, namely, the range ($\pm \alpha$) which is regarded as a state in which the tracking servo is executed can be determined by the values of the coefficient values $K_b$ and $K_c$ which are multiplied to the second and third tracking error signals $e_b$ and $e_c$ in FIG. 3. When $K_b = K_c = 1$, if the beam spot was deviated from the center point of the track by only $\pm 45°$, the detracking state is determined. As the values of $K_b$ and $K_c$ are increased, the discriminating range of the on-track state is also increased.

In FIG. 3, as shown by a broken line, by supplying the outputs $S_1$ and $S_2$ of the comparators 5a and 5b to an OR gate 7 whose one input terminal is used as a negative logic input, it is possible to obtain a signal $S_{BT}'$ in which a range of $\pm \beta$ ($\beta = 180° - \alpha$) from the track point $T_O$ can be determined to be the on-tracking state.

On the other hand, by adding the tracking error signals $e_b$ and $e_c$ which are obtained from the second and third detectors 1b and 1c by the adding circuit 3e, a tracking error signal Et (90°) whose phase was shifted by 90° can be obtained. By using this tracking error signal, the moving direction of the optical head can be detected.

Figure 8:
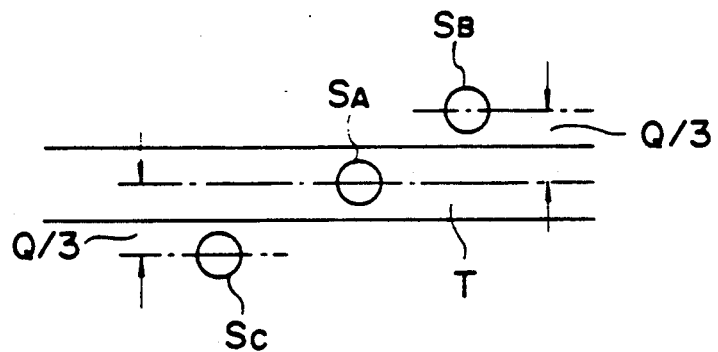
FIG. 8 is an explanatory diagram of beam irradiating positions in another embodiment of the present invention.
Figure 9:
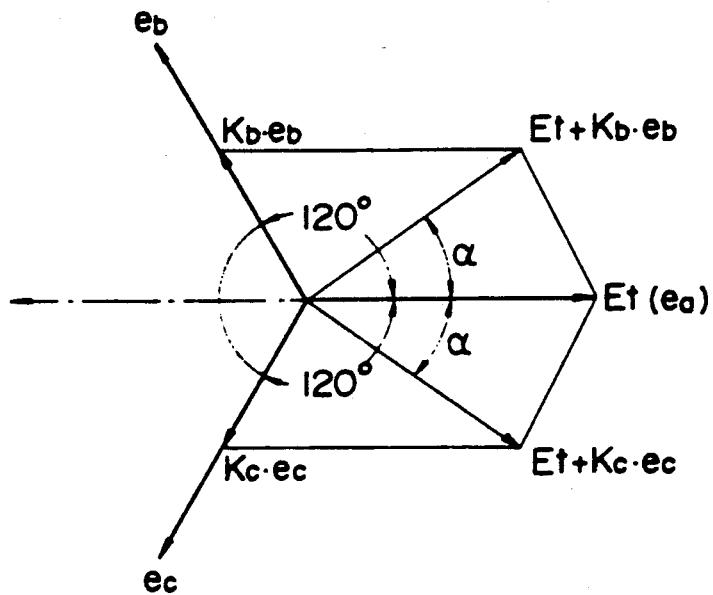
FIG. 9 is an explanatory diagram of phase differences among three tracking error signals in another embodiment.

FIG. 8 shows irradiating positions of beam spots showing another embodiment of the invention. In the embodiment, the second and third beam spots $S_B$ and $S_C$ are arranged so as to be away from the first beam spot $S_A$ by ⅓ track pitch, respectively. Therefore, in this case, as shown in a vector diagram of FIG. 9, three tracking error signals $e_a$ (Et), $e_b$ and $e_c$ having the phase difference of 120° are generated.

FIG. 10 shows phase waveforms of a traverse signal of the three tracking error signals and composite tracking error signals.

In the case of this embodiment as well, the composite tracking error signals (Et + $e_b \cdot K_b$) and (Et + $e_c \cdot K_c$) are input to the comparators 5a and 5b and the detrack detection signal $S_{BT}$ can be obtained from the AND gate 6 by the system as mentioned above.

In the case of the embodiment, when the coefficient values $K_b$ and $K_c$ are set to 1, the on-track range ($\pm \alpha$) is set to $\pm 60°$ and as the coefficient values are decreased, the discriminating range of the on-track is also decreased.

As described above, according to the detrack detecting system of the invention, three beam spots are irradiated onto the optical disc, the polarities of the tracking error signals which are obtained from the three beam spots are discriminated by the logic circuit, and the detracking state is detected. Therefore, even in the case where the reflectances of the optical discs are different or where the kinds of recording media provided on the recording surfaces of the optical discs are different, the detracking state can be accurately detected.

I claim:

1. A detrack detecting system in an optical recording-/reproducing apparatus in which recording and reproducing of data are performed by irradiating beam spots onto an optical disc, comprising:

means for irradiating a first beam spot which follows a center of a data recording track;

means for irradiating second and third beam spots at positions which are respectively spaced away from the first beam spot by a predetermined distance on the inner circumferential side and the outer circumferential side in the radial direction of said optical disc;

first, second and third photodetectors for detecting reflected lights from the first, second and third beam spots, respectively, and producing first, second and third tracking error signals, respectively, first, second third and fourth signal adders; and polarity detecting means, wherein:

said first signal adder combines said second and third tracking error signals, said second adder combines the first tracking error signal and an output derived from said first adder, said third adder forms a first composite tracking error signal by combining an output derived from said adder, and said fourth adder forms a second composite tracking error signal by combining an output derived from said third tracking error signal and an output from said second added and;

said polarity detecting means is responsive to outputs of said third and fourth adders for detecting a detracking state on the basis of the polarities of said first and second composite tracking error signals.

2. A detrack detecting system in an optical recording-/reproducing apparatus according to claim 1, wherein the second and third beam spots are irradiated at positions which are away from the first beam spot by a ¼ track pitch.

3. A detrack detecting system in an optical recording-/reproducing apparatus according to claim 2, further comprising a coefficient circuit connected between said first and second adders for multiplying an output of said first adder by a predetermined coefficient, said second adder subtracting said multiplied output from said first tracking error signal to produce a tracking error signal having substantially no DC component.

4. A detrack detecting system in an optical recording-/reproducing apparatus according to claim 1, wherein the second and third beam spots are irradiated at positions which are away from the first beam spot by a ½ track pitch.

5. A detrack detecting system in an optical recording-/reproducing apparatus according to claim 1, further comprising second and third coefficient circuits respectively multiplying said second and third tracking error signals to produce said outputs derived from said second and third tracking error signals.

6. A detrack detecting system in an optical recording-/reproducing apparatus according to claim 1, wherein said polarity detecting means includes an AND gate and means for detecting the polarities of the first and second composite tracking error signals by detecting zero-cross points thereof, respectively, and supplying one detection signal and an inverted detection signal to said AND gate.

7. A detrack detecting system in an optical recording-/reproducing apparatus according to claim 1, wherein said polarity detecting means includes an OR gate and means for detecting the polarities of the first and second composite tracking error signals are detected by detecting zero-cross points thereof, respectively, and supplying one detection signal and an inverted detection signal to said OR gate.

8. A detrack detecting system in an optical recording-/reproducing apparatus according to claim 1, further comprising a fifth signal adder for subtracting the third tracking error signal from the second tracking error signal to determine the moving direction of the beam spot.

* * * * *

UNITED STATES PATENT AND TRADEMARK OFFICE
CERTIFICATE OF CORRECTION

PATENT NO.  : 5,148,424
DATED       : September 15, 1992
INVENTOR(S) : Shigeaki Wachi It is certified that error appears in the above-indentified patent and that said Letters Patent is hereby corrected as shown below: On the title page, item [56]:

In "References Cited" 4,817,073, change "36/44.28" to --369/44.28--

Col. 1, line 8, change "o" to --of--
line 20, change "$S_C4$" to --$S_{cn}$--
line 26, change "ar" to --are--
Col. 2, line 14, delete "the" first occurrence
line 19, delete "the"
Col. 3, line 30, change "$E_B$" to --$E_D$--
line 50, change "$S_{BT}$" to --$S_{DT}$--
line 52, change "$S_{BT}$" to --$S_{DT}$--
line 54, change "$S_{BT}$" to --$S_{DT}$--
Col. 4, line 2, change "$S_{BT}$'" to --$S_{DT}$'--
line 26, change "$S_{BT}$" to --$S_{DT}$--

In the Claims:
Col. 4, line 59, change "," second occurrence to --;--
line 67, after "said" first occurrence insert --second tracking error signal and an output from said second--
Col. 5, line 3, change "added" to --adder--

Signed and Sealed this

Nineteenth Day of July, 1994

Attest:

BRUCE LEHMAN

Attesting Officer

Commissioner of Patents and Trademarks